(12) United States Patent
Wilson

(10) Patent No.: US 9,987,893 B2
(45) Date of Patent: Jun. 5, 2018

(54) DOLLY STABILIZER

(71) Applicant: Sharmel Wilson, Chesapeake, VA (US)

(72) Inventor: Sharmel Wilson, Chesapeake, VA (US)

( * ) Notice: Subject to any disclaimer, the term of this patent is extended or adjusted under 35 U.S.C. 154(b) by 0 days. days.

(21) Appl. No.: 14/954,477

(22) Filed: Nov. 30, 2015

(65) Prior Publication Data

US 2016/0375736 A1    Dec. 29, 2016

Related U.S. Application Data

(60) Provisional application No. 62/123,767, filed on Nov. 28, 2014.

(51) Int. Cl.
| | |
|---|---|
| *B60D 1/02* | (2006.01) |
| *B60D 1/30* | (2006.01) |
| *B60T 7/20* | (2006.01) |
| *B60T 8/24* | (2006.01) |

(52) U.S. Cl.
CPC ............ *B60D 1/30* (2013.01); *B60D 1/02* (2013.01); *B60T 7/20* (2013.01); *B60T 8/248* (2013.01); *B60T 2230/06* (2013.01)

(58) Field of Classification Search
CPC . B60D 1/02; B60D 1/155; B60D 1/30; B60D 1/34; B60D 1/54
USPC ...................................................... 280/455.1
See application file for complete search history.

(56) References Cited

U.S. PATENT DOCUMENTS

| | | | | |
|---|---|---|---|---|
| 3,972,540 A | * | 8/1976 | Donaldson | B60P 3/40 188/129 |
| 4,420,169 A | * | 12/1983 | Taylor | B60D 1/06 280/446.1 |
| 4,763,916 A | * | 8/1988 | Ratsko | B62D 53/0871 280/432 |
| 4,768,801 A | * | 9/1988 | DeWitt | B62D 53/0807 280/142 |
| 5,707,071 A | * | 1/1998 | Prestidge | B62D 53/0878 105/3 |
| 5,957,476 A | * | 9/1999 | Simpson | B62D 53/0871 280/432 |

(Continued)

FOREIGN PATENT DOCUMENTS

| | | | | |
|---|---|---|---|---|
| DE | 2924359 A1 | * | 12/1980 | B60D 1/02 |
| DE | 10355228 A1 | * | 6/2005 | B60D 1/02 |

(Continued)

*Primary Examiner* — Joseph M Rocca
*Assistant Examiner* — Maurice L Williams
(74) *Attorney, Agent, or Firm* — Bradley Goldizen

(57) ABSTRACT

A dolly stabilizer is mounted onto a rear end of a trailer and has a stabilizer plate, a stabilizer pin, and a control box. The stabilizer plate is mounted to a chassis having at least one pair wheels. The stabilizer plate may comprise a plurality of mounting holes. It includes a dolly tongue stabilizer pin hole that receives the stabilizer pin. The stabilizer plate includes an internal piston that is selectively driven into a recess or opening in the stabilizer pin to straighten a position of a subsequent trailer or dolly relative to a preceding one. The control box includes a pneumatic input for receiving pressurized air and a pneumatic output to brakes on the dolly. A speed sensor may be coupled to the control box for allowing speed control of the dolly wheels. Electrical connections accept power for operating lights and other electrical devices on the dolly.

9 Claims, 8 Drawing Sheets

(56) References Cited

U.S. PATENT DOCUMENTS

| | | | | |
|---|---|---|---|---|
| 7,156,410 B1 * | 1/2007 | Maskaleris | ........ | B62D 53/0878 |
| | | | | 280/432 |
| 7,506,885 B2 * | 3/2009 | Colibert | ................ | B60D 1/065 |
| | | | | 280/405.1 |
| 8,511,702 B1 * | 8/2013 | Howell | .................... | B60D 1/30 |
| | | | | 280/432 |
| 8,571,777 B2 * | 10/2013 | Greene | .................... | B60D 1/30 |
| | | | | 701/70 |
| 2007/0252359 A1 * | 11/2007 | Wishart | .................. | B60D 1/30 |
| | | | | 280/477 |
| 2009/0045603 A1 * | 2/2009 | Huntimer | ............... | B60D 1/305 |
| | | | | 280/455.1 |
| 2012/0200064 A1 * | 8/2012 | Gallego | ................ | B60D 1/155 |
| | | | | 280/446.1 |
| 2017/0151845 A1 * | 6/2017 | Allcorn | .................... | B60D 1/30 |

FOREIGN PATENT DOCUMENTS

| | | | | | |
|---|---|---|---|---|---|
| DE | 102004047404 A1 | * | 3/2006 | ............... | B60D 1/02 |
| DE | 102008004318 A1 | * | 7/2009 | ........... | A01B 59/041 |
| EP | 3090887 A1 | * | 11/2016 | ............. | B60D 1/143 |
| JP | 59050801 A | * | 3/1984 | ............... | B60D 1/30 |
| WO | WO-2013072854 A1 | * | 5/2013 | ................ | B60D 1/02 |

* cited by examiner

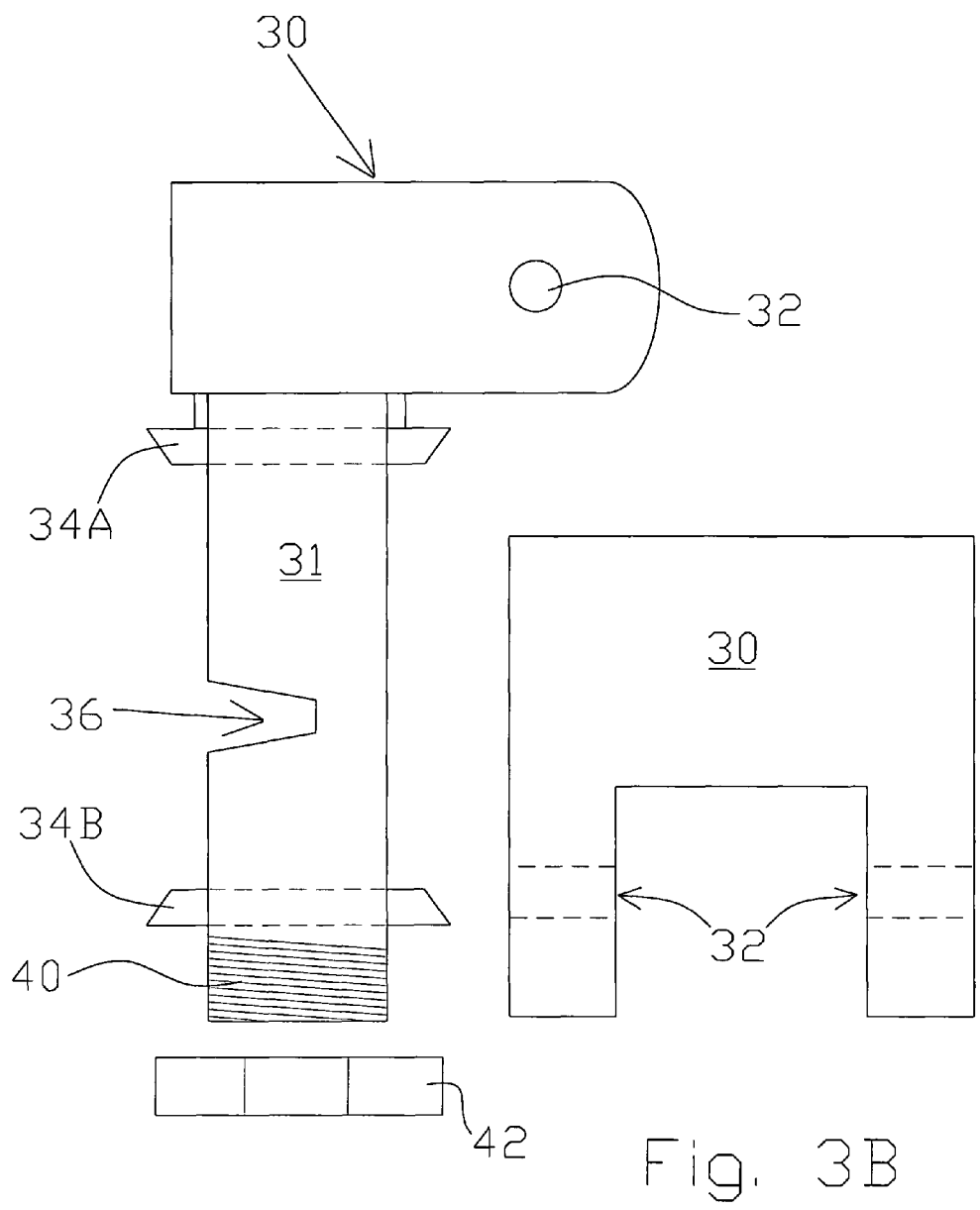

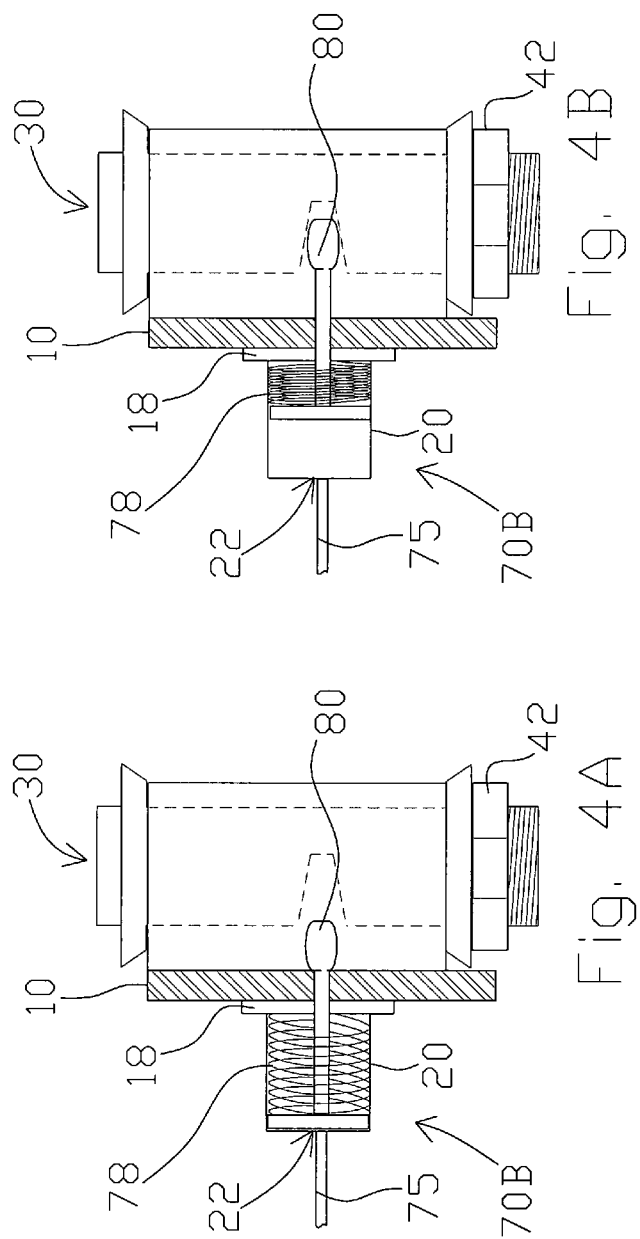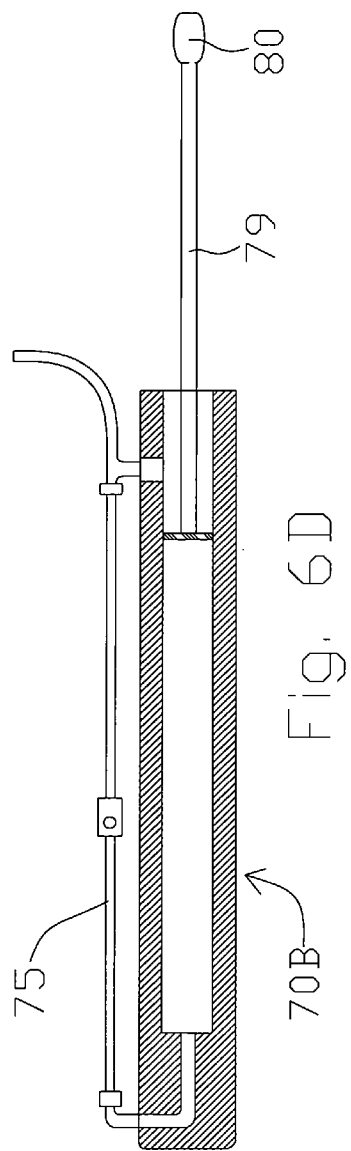

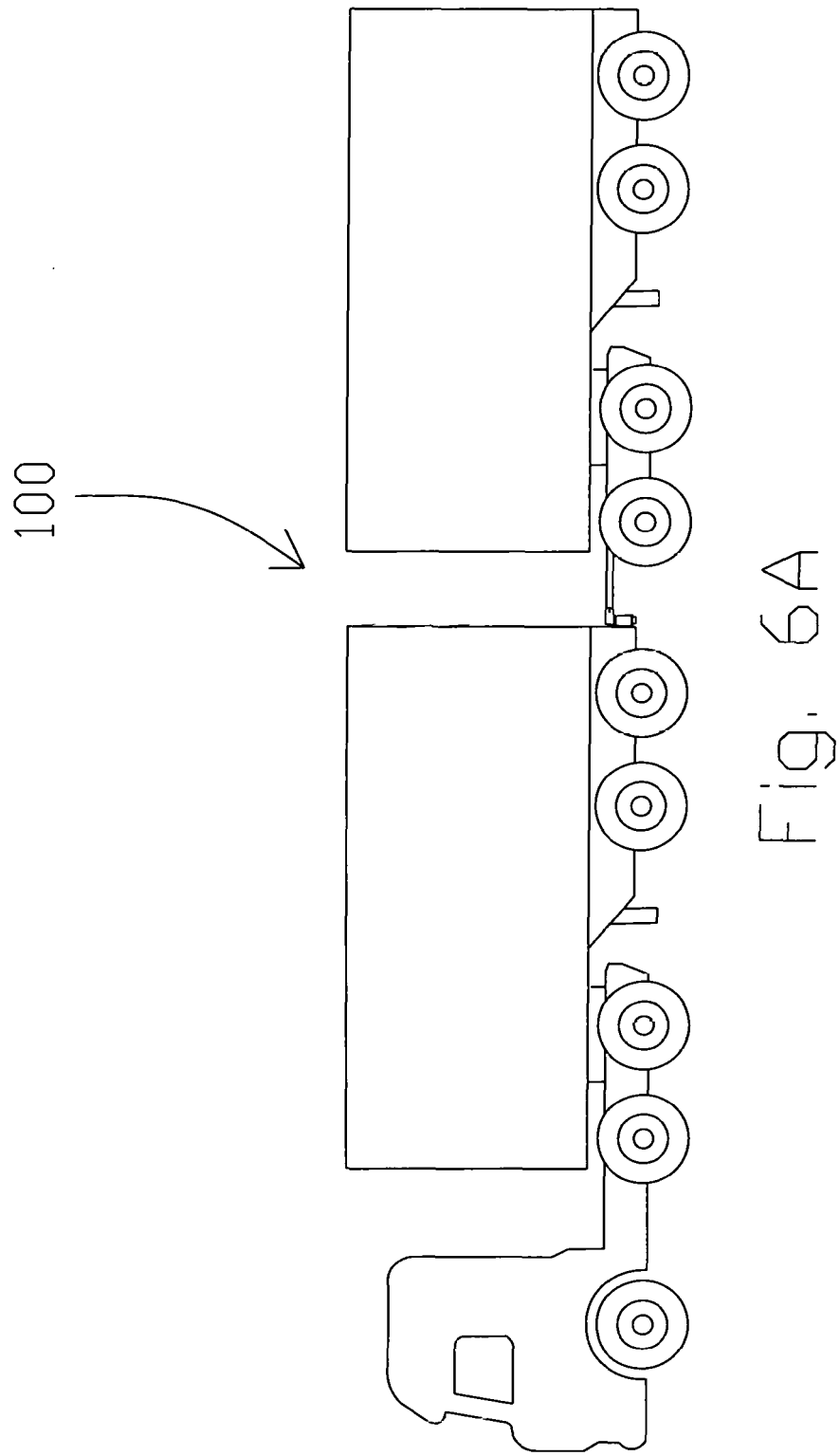

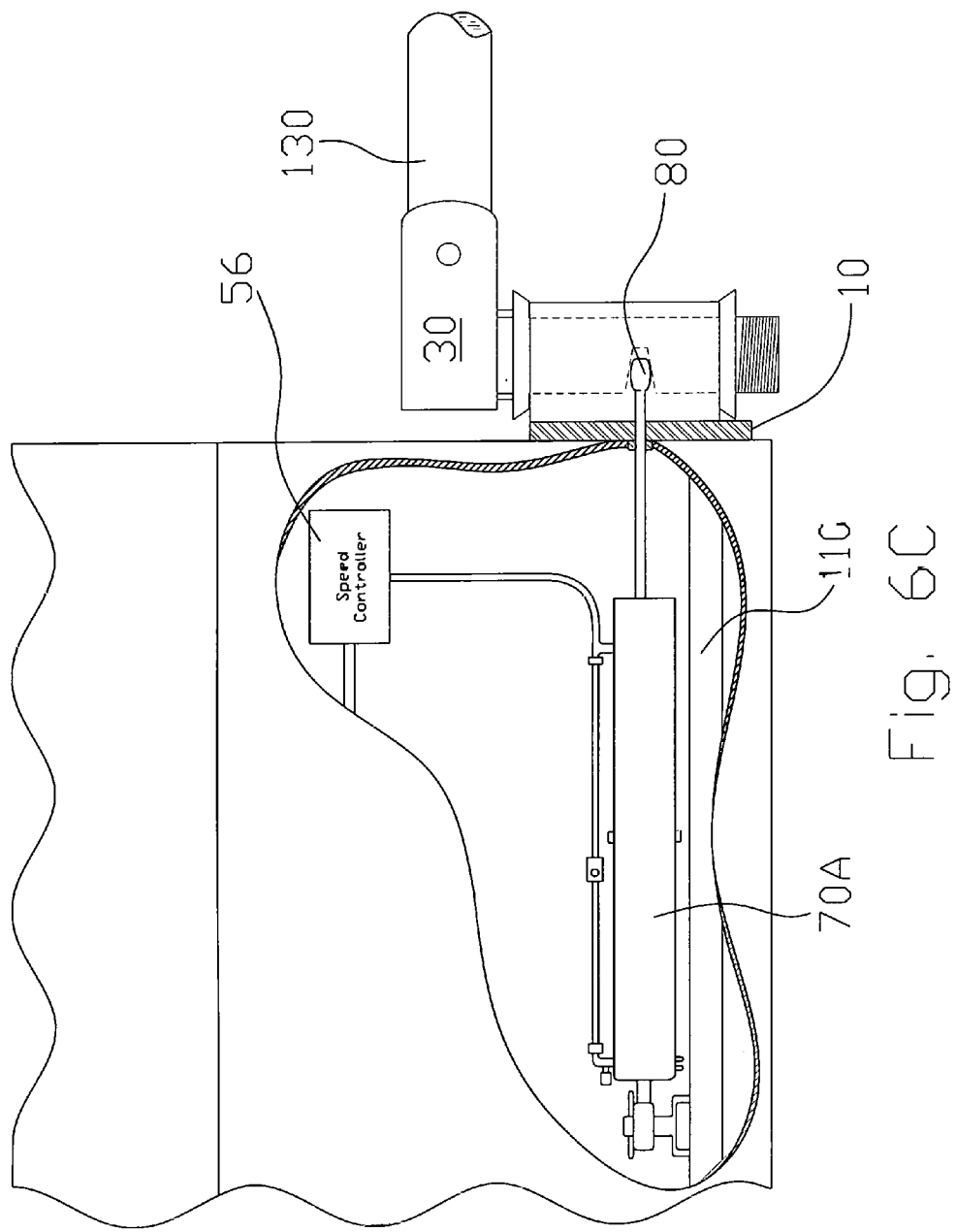

DOLLY STABILIZER

The present application relates to U.S. Provisional Patent Application Ser. No. 62/123,767 filed on Nov. 28, 2014 and claims priority therefrom.

The present application was not subject to federal research and/or development funding.

TECHNICAL FIELD

Generally, the invention relates to a dolly stabilizer arranged between a trailer and a dolly. Specifically, the invention is a dolly stabilizer mounted onto a rear end of a trailer having a stabilizer plate, a stabilizer pin, a piston with an extendible rod and a control box that regulates fluid flow to the piston. The stabilizer plate is mounted to a chassis having at least one pair wheels mounted beneath it. The stabilizer plate comprises a plurality of mounting holes and a dolly tongue stabilizer pin hole that receives the stabilizer pin. The extendible piston rod includes an end that passes through the stabilizer plate and into a cavity within the stabilizer pin, in one instance. In another instance, the piston is formed within the stabilizer plate and includes the free end which is arranged on the exterior of the stabilizer plate. In another instance, the control box includes a pneumatic input for receiving pressurized air and a pneumatic output for actuating the device when a following or successive trailer begins fishtailing. The control box may also include a microprocessor and sensors to control air brakes on the dolly. A speed sensor may be coupled to the control box for allowing speed control of the dolly wheels such that the brakes are applied when the dolly exceeds a preset speed. Electrical connections accept power for operating lights and other electrical devices on the dolly. For purposes of this disclosure, the term "fluid" should be construed to include liquid, gas, or air.

BACKGROUND OF THE INVENTION

A dolly is a small trailer device used in the trucking industry to configure a road train. A road train comprises a truck or tractor that pulls two or more trailers. The dolly may be coupled to the rear end of a truck or trailer and is used to support the front end the additional trailer. Typically the dolly comprises a chassis or frame and a modular subassembly of wheels and axels having a fifth wheel coupling mounted on its top side. The dolly may comprise various tongues.

Another type of dolly is a tow dolly. A tow dolly is a chassis attached to at least two wheels, an axle and a tow-hitch. The tow dolly receives the front wheels of an automobile to allow it to be pulled behind another vehicle. Many recreational vehicle owners use them for towing smaller automobiles behind their larger recreational vehicles.

Drivers must exercise care when operating a road train or using a dolly. In certain driving conditions, the dolly may cause a fish-tailing effect on the road train or pulling vehicle. This fish tailing can cause accidents. An aim of the present invention is reduce the fish-tailing effect caused by use of a dolly.

SUMMARY OF THE INVENTION

The instant invention is a dolly stabilizer attached to a dolly assembly for use in configuring a road train of multiple trailers being hauled about by a conventional tractor, a truck, or other such vehicle. The instant device allows the subsequent trailer to pivot or traverse in the horizontal plane relative to the preceding trailer to facilitate turning when a piston rod end is retracted during normal, safe operating conditions. When an unsafe driving condition is experienced, the device is actuated causing the piston rod end to extend into a conical cavity in a stabilizer pin arranged within an opening in the stabilizer plate. The conical cavity extends into only a portion of the stabilizer pin and has an open end and a closed end. The open end is oversized to accept the end of the piston rod and having a larger diameter than that of the closed end to allow the piston rod end to be driven into the cavity over a range of degrees. When viewed from the end, the opening or cavity is cone-shaped. The further the cylinder is driven into the stabilizer the straighter the stabilizer pin becomes relative to a zero degree reference point defined as being where the trailers are in direct alignment with one another. That is, the subsequent trailer may be straightened with respect to the preceding one by actuating the dolly stabilizer device.

The dolly stabilizer device of the instant disclosure comprises a stabilizer plate, a stabilizer pin, a piston, and a control box. The stabilizer plate is mounted to a chassis having at least one pair of wheels mounted at opposite ends of an axel. The stabilizer plate comprises a plurality of mounting holes and a dolly tongue stabilizer pin hole that receives the stabilizer pin. The cylinder is arranged within the stabilizer plate and forced into the stabilizer pin causing the alignment trailers when actuated.

The control box includes a pneumatic input for receiving pressurized air and a pneumatic output to actuate a cylinder pin which is driven into an opening in the stabilizer pin that straightens the tongue of the dolly while locking it into fixed position. A speed sensor may be coupled to the control box for allowing speed control of the dolly wheels. Electrical connections accept power for operating lights and other electrical devices on the dolly.

It is an object of the invention to provide a dolly stabilizer that automatically aligns a pair of trailers to more easily control a road train.

Additional objects and advantages of the invention will be set forth in part in the description which follows, and in part will be obvious from the description, or may be learned from practicing the invention. The objects and advantages of the invention will be obtained by means of instrumentalities in combinations particularly pointed out in the appended claims.

BRIEF DESCRIPTION OF THE DRAWINGS

FIG. 3A shows a side view of a tongue stabilizer pin. FIG. 3B shows an overhead or top view of the tongue stabilizer pin.

FIGS. 4A and 4B illustrate a first embodiment of the invention in a first position whereby the tongue of the succeeding trailer is allowed to traverse relative to the preceding trailer and in a second position the succeeding trailer is straightened and locked in a fixed non-traversing position with respect to the preceding trailer.

FIG. 6A shows a truck train having two trailers. FIG. 6C is an enlarged view of an activated dolly stabilizer and showing an air bladder and the various devices which control the dolly stabilizer. FIG. 6D is a cross-section view of the piston shown in FIG. 6C.

DETAILED DESCRIPTION OF THE INVENTION

Figure 1:
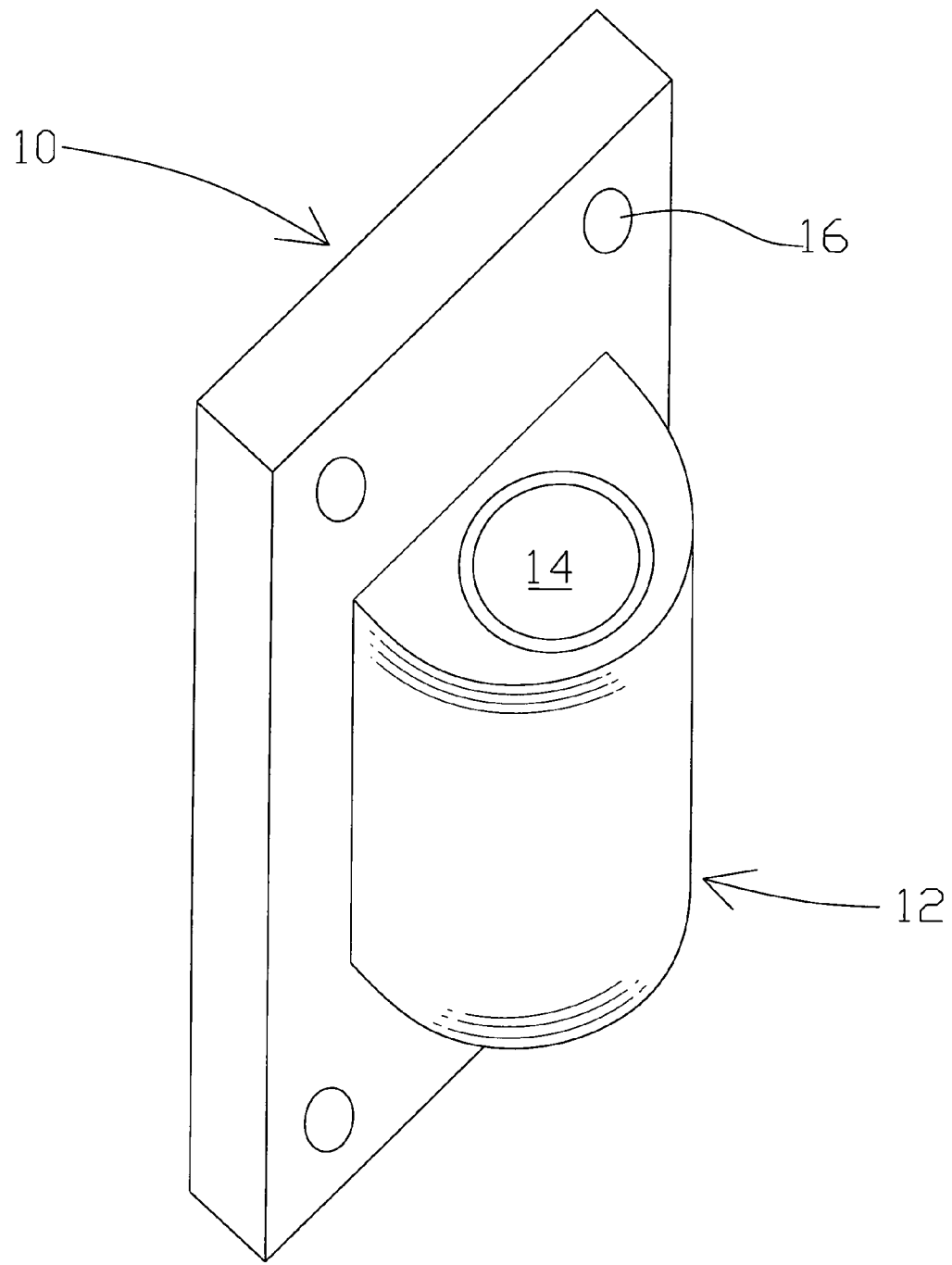
FIG. 1 shows a front view of a stabilizer plate.

The embodiments of the invention and the various features and advantageous details thereof are more fully explained with reference to the non-limiting embodiments and examples that are described and/or illustrated in the accompanying drawings and set forth in the following description. It should be noted that the features illustrated in the drawings are not necessarily drawn to scale, and the features of one embodiment may be employed with the other embodiments as the skilled artisan recognizes, even if not explicitly stated herein. Descriptions of well-known components and techniques may be omitted to avoid obscuring the invention. The examples used herein are intended merely to facilitate an understanding of ways in which the invention may be practiced and to further enable those skilled in the art to practice the invention. Accordingly, the examples and embodiments set forth herein should not be construed as limiting the scope of the invention, which is defined by the appended claims. Moreover, it is noted that like reference numerals represent similar parts throughout the several views of the drawings.

FIG. 1 shows a front view of a stabilizer plate 10 which mounts onto a rear end of a first or preceding trailer chassis or frame. The stabilizer plate 10 includes mounting holes 16 and rectangular plate comprising an opening 14 that accepts a dolly tongue stabilizer pin 31 shown in FIGS. 3A-3B. The opening 14 is formed on the plate and may comprising a cylindrical piece of metal 12 that is welded onto the rectangular plate. The preferred dimensions are displayed on FIG. 1 in inches. In this instance, the stabilizer plate is 9.5" wide by 11" high. The dolly tongue stabilizer pin hole 14 includes a circular opening having a diameter of substantially 2.5" with a vertical rise of 6" and is arranged approximately 2.5" from opposite sides of the stabilizer plate 10.

Figure 2:
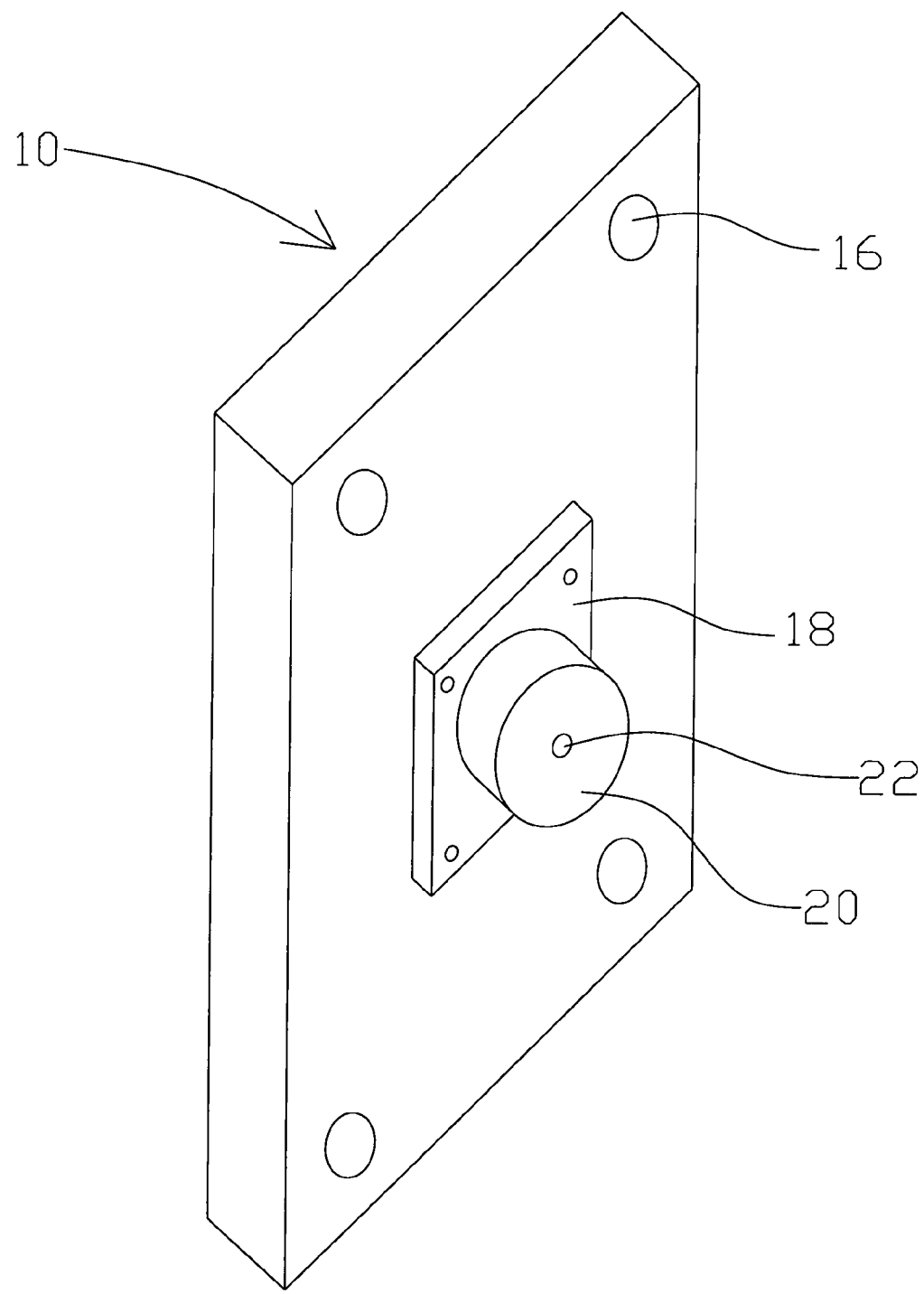
FIG. 2 shows a back view of a stabilizer plate in a first embodiment of the invention.

FIG. 2 shows a back view of a stabilizer plate 10 which includes the through openings 16 for accepting bolts to fasten the stabilizer plate onto the rear of the dolly. In one instance, the backside of the stabilizer plate includes a chamber 20 and pin booster 18 which communicates with the stabilizer pin 30 to straighten it when air pressure is increased in the piston causing the rod to extend. In this instance, a piston rod end 80, as shown in FIGS. 4B, 6C and 6D, is forced or driven into the cavity 36 shown in FIG. 3A. This forces the trailer into alignment with the preceding truck or trailer. In one embodiment, opening 22 receives pressurized air to actuate a piston arranged within chamber 20, as shown in FIGS. 4A, 4B. In a second embodiment, the opening operates as a guide through which an external piston rod extends.

FIG. 3A shows a side view of a tongue stabilizer pin 30 and associated pin hole 36 into which air pressure or a piston is driven. The stabilizer pin 30 has an upper bearing 34A and a lower bearing 34B arranged on shank 31 for allowing the pin 30 to twist within the dolly tongue stabilizer pin hole 14 shown in FIG. 1. Thus, the pin 30 may traverse within the tongue stabilizer pin hole 14, as more clearly understood in FIG. 4A. An upper region includes a rounded back end and a squared off front end. A cavity 36, that periodically receives a piston rod end, is arranged substantially midway between the upper 34A and lower bearing 34B. The lower end 40 is threaded for receiving a lock nut 42 to secure the tongue stabilizer pin 30 within the dolly tongue stabilizer pin hole 14. As can be recognized by viewing FIG. 3B, the tongue stabilizer pin includes an upper region that comprises a yoke and includes a pair of aligned openings 32 for receiving the dolly tongue and coupling the pin 30 thereto.

FIG. 4A illustrates a first embodiment of the invention in a first position whereby the tongue of the succeeding trailer is allowed to traverse relative to the preceding trailer. This traversing is necessary to allow the train to snake around turns. In this instance, no air is applied to the stabilizer plate 10. A piston 71 is created within the chamber 20 and receives fluid, preferably pressurized air, from a fluid conduit 75. Fluid flow through the conduit 75 is controlled by a valve arranged upstream from the piston 71. The piston 71 includes a cap end 76 arranged at one end of a piston rod 79 which is linearly driven when pressurized air enters chamber 20. A spring 78 biases the piston rod end 80 away from the cavity 36 of the stabilizer pin 30. In this instance, the piston rod end 80 is retracted such that it does not communicate with the stabilizer pin. In FIG. 4B, pressurized air is applied to the piston 70 causing the piston rod end 80 to be seated within the cavity 36 of the stabilizer pin 30. This straightens the stabilizer pin 30 which is rigidly affixed to the succeeding trailer and pulls it into alignment the preceding trailer.

Figure 5A:
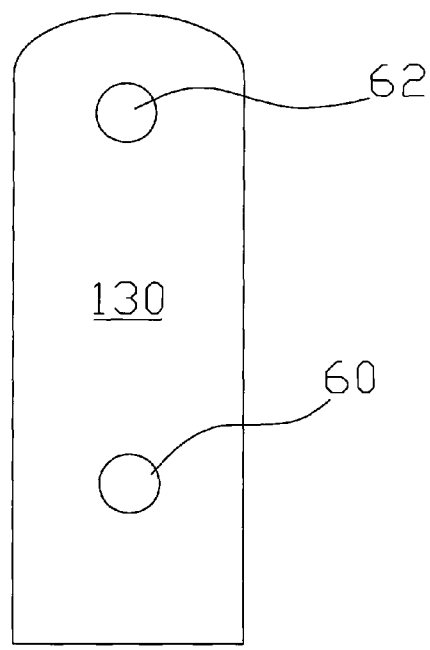
FIG. 5A shows a side view of dolly tongue.
Figure 5B:
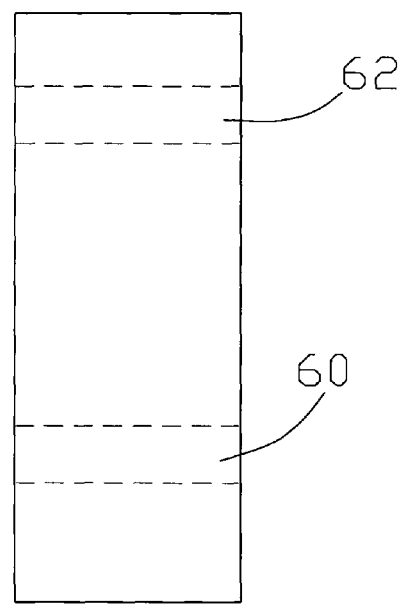
FIG. 5B is a top view of the dolly tongue.

FIG. 5A shows a side view of dolly tongue coupler and associated holes 60, 62 for attaching the dolly wheels to the stabilizer pin. As can be recognized by FIG. 5B, the dolly tongue is cylindrical when viewed from above.

The preferred method of operation of the invention prevents a train or trailer from fishtailing. The stabilizer pin and its mount are bolted or otherwise fastened to the trailer rear ICC bumper plate. The stabilizer plate bolts or fastens to the back side of the ICC bumper plate. The ICC bumper plate is centered in the middle of the stabilizer pin mount and the stabilizer plate with the cylinder mounted on the back thereof. The control box is preferably mounted beneath the trailer and receives a feedback signal from the speed sensor which monitors the speed of the train or trailer. When the train or trailer reaches a preset limit, preferably 45 mph, the control box then sends a signal causing the piston 70A, 70B to extend the piston rod end 80 from the plate 10 into the opening 36 to lock the stabilizer pin 30 in place. This straightens the train or trailer preventing fishtailing. When the train or trailer drops below a preset speed threshold, preferably 25 mph, the control box 50, through a control valve (not shown), either shuts off the flow of pressurized air allowing spring 78 to retract piston rod end 80 as shown in FIG. 4B, or reverses the direction of air flow through piston 70A of FIG. 6C to disengage the piston rod end 80 from the stabilizer pin to free up the train or trailer and again allow it to freely turn. When the piston rod end 80 is engaged, the connection point between two trailers is rigid; when the piston rod end 80 is disengaged, the connection point is dynamic and allowing the connection point a freedom of radial rotation such that a succeeding trailer turns relative to a preceding trailer.

Figure 6B:
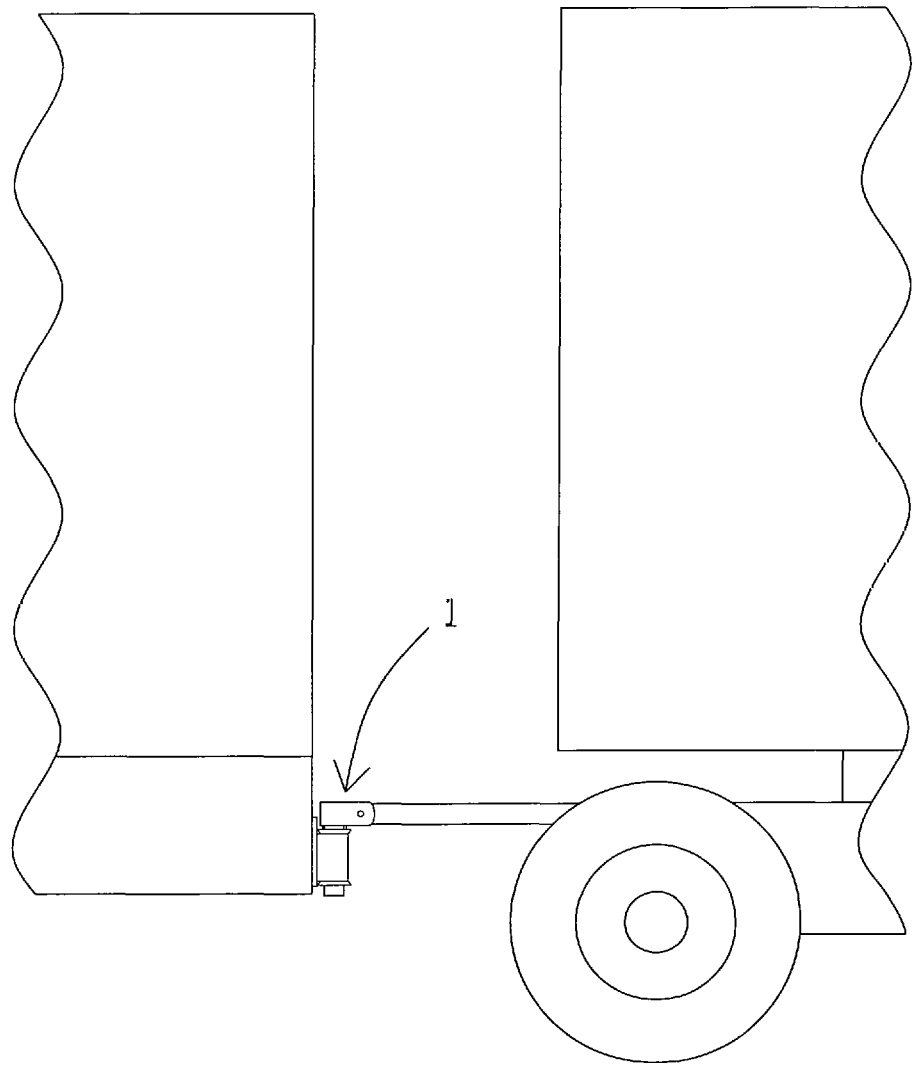
FIG. 6B is an enlarged view of the coupling between the two trailers shown in FIG. 6A.

FIG. 6A shows a trailer train 100 for which the dolly stabilizer is useful. As more clearly shown in FIGS. 6B, 6C, the dolly stabilizer 1 includes a pneumatic cylinder or piston coupled to an air source, not shown. The piston is configured with a switch that can route air into the bladder to drive the internal piston 80 in a first direction and a second direction that is opposite to the first direction. In this manner, the connection point may radially limited between two trailers.

Figure 7:
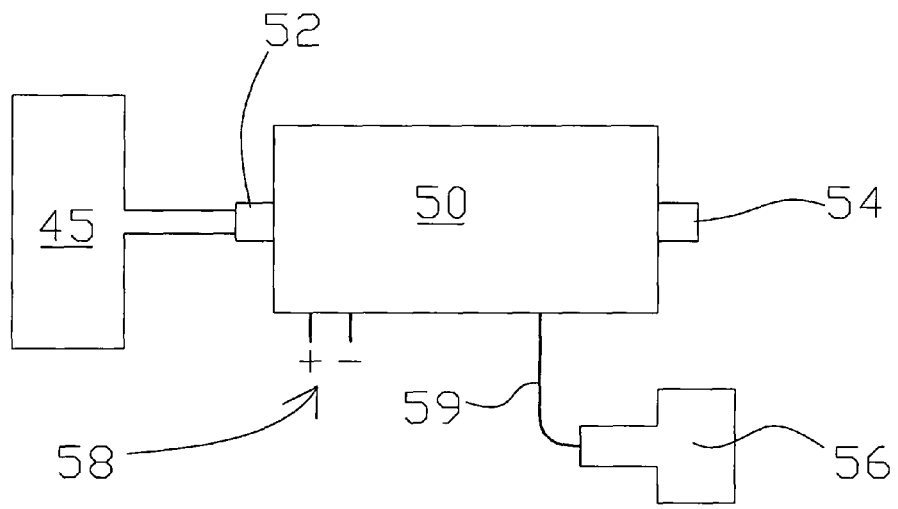
FIG. 7 shows a schematic view of a control box.

FIG. 7 shows a control box 50 for the chamber and pin booster that comprises an air inlet 52 that receives pressurized air from air source 45. An air outlet 54 directs pressurized air into piston 70A, 70B. Pins 58 accept voltage from a voltage source to operated control box 50. Conductor 59 extends to a speed sensor 56 which is coupled to the trailer wheels for sensing the trailer's speed. When the trailer exceeds a specific speed, the control box 50 which includes a microprocessor automatically triggers the air pressure to be released from the air outlet. When the wheels of the trailer exceed a preset speed, the trailer brakes are applied until the wheels are reduced to a preset speed at which time the wheels are freed by disengaging the brakes.

It is to be understood that the invention is not limited to the exact construction illustrated and described above, but that various changes and modifications may be made without departing from the spirit and the scope of the invention as defined in the following claims. While the invention has been described with respect to preferred embodiments, it is intended that all matter contained in the above description or shown in the accompanying drawings shall be interpreted as illustrative and not in limiting sense. From the above disclosure of the general principles of the present invention and the preceding detailed description, those skilled in the art will readily comprehend the various modifications to which the present invention is susceptible. Therefore, the scope of the invention should be limited only by the following claims and equivalents thereof.

I claim:

1. A device that prevents a train from fishtailing said device comprising:
    a stabilizer plate mounted onto a rear end of a trailer frame comprising a vertical dolly tongue stabilizer pin opening for accepting a dolly tongue stabilizer pin, said dolly tongue stabilizer pin opening being formed on a first face of the stabilizer plate, said stabilizer plate further including a second face that includes a chamber that houses a spring-biased piston which includes a piston rod end which extends when actuated to force alignment of a dolly with the trailer frame;
    the dolly tongue stabilizer pin arranged within the dolly tongue stabilizer pin opening and having a shank, said dolly tongue stabilizer pin having a flared cavity into which said piston rod end is driven when said device is activated, said dolly tongue stabilizer pin having an upper bearing and a lower bearing arranged on the shank to allow the dolly tongue stabilizer pin to twist within the dolly tongue stabilizer pin opening when the piston rod end is retracted, said dolly tongue stabilizer pin having an upper end that comprises a yoke and a pair of aligned openings which receive a trailer tongue coupler, a lower end of said shank having threads which receive a locknut to secure the dolly tongue stabilizer pin within the dolly tongue stabilizer pin opening; and,
    a source of pressurized air which provides air into said piston when fishtailing occurs between the dolly and trailer frame.

2. The device of claim 1 wherein an upper region of said dolly tongue stabilizer pin includes a rounded back end and a square front end.

3. The device of claim 1 wherein said dolly tongue stabilizer pin opening comprises a cylindrical piece of metal that is welded onto the stabilizer plate.

4. The device of claim 1 wherein the stabilizer plate is 9.5" wide by 11" high.

5. The device of claim 1 wherein the dolly tongue stabilizer pin opening includes a circular opening having a diameter of substantially 2.5" with a vertical rise of 6" and is arranged approximately 2.5" from opposite sides of the stabilizer plate.

6. The device of claim 1 further comprising a pneumatic control box that comprises an air inlet receiving pressurized air from the source of a pressurized air, an air outlet that directs pressurized air to the piston, pins which accept voltage for operating the pneumatic control box, and a conductor extending to a speed sensor which detects the speed of the dolly wheels.

7. The device of claim 1 further comprising a dolly tongue coupler arranged between the yoke of the dolly tongue stabilizer pin and a dolly tongue.

8. A device that prevents a train from fishtailing said device comprising:
    a stabilizer plate mounted onto a rear end of a trailer frame comprising a vertical dolly tongue stabilizer pin opening for accepting a dolly tongue stabilizer pin, said dolly tongue stabilizer pin opening being formed on a first face of the stabilizer plate, said stabilizer plate further including a second face that includes a chamber that houses a piston which includes a piston rod end which extends when actuated to force alignment of a dolly with the trailer frame;
    the dolly tongue stabilizer pin arranged within the dolly tongue stabilizer pin opening and having a shank, said dolly tongue stabilizer pin having a flared cavity into which said piston rod end is driven when said device is activated, said dolly tongue stabilizer pin having an upper bearing and a lower bearing arranged on the shank to allow the dolly tongue stabilizer pin to twist within the dolly tongue stabilizer pin opening when the piston rod end is retracted, said dolly tongue stabilizer pin having an upper end that comprises a yoke and a pair of aligned openings which receive a trailer tongue coupler, a lower end of said shank having threads which receive a locknut to secure the dolly tongue stabilizer pin within the dolly tongue stabilizer pin opening;
    a source of pressurized air which provides air into said piston when fishtailing occurs between the dolly and trailer frame;
    a pneumatic control box that comprises an air inlet receiving pressurized air from a pressurized air source, an air outlet that directs pressurized air to the piston, pins which accept voltage for operating the pneumatic control box, and a conductor extending to a speed sensor which detects speed of dolly wheels; and,
    a dolly tongue coupler arranged between the yoke of the dolly tongue stabilizer pin and a dolly tongue;
    wherein an upper region of said dolly tongue stabilizer pin includes a rounded back end and a square front end;
    wherein said dolly tongue stabilizer pin opening comprises a cylindrical piece of metal that is welded onto the stabilizer plate;
    wherein the stabilizer plate is 9.5" wide by 11" high;
    wherein the dolly tongue stabilizer pin opening includes a circular opening having a diameter of substantially 2.5" with a vertical rise of 6" and is arranged approximately 2.5" from opposite sides of the stabilizer plate.

9. A device that prevents a train from fishtailing said device comprising:
    a stabilizer plate mounted onto a rear end of a trailer frame comprising a vertical dolly tongue stabilizer pin opening for accepting a dolly tongue stabilizer pin, said dolly tongue stabilizer pin opening being formed on a first face of the stabilizer plate;

a dolly tongue stabilizer pin arranged within the dolly tongue stabilizer pin opening and having a shank, said dolly tongue stabilizer pin having a flared cavity, said dolly tongue stabilizer pin having an upper bearing and a lower bearing arranged on the shank to allow the dolly tongue stabilizer pin to twist within the dolly tongue stabilizer pin opening, said dolly tongue stabilizer pin having an upper end that comprises a yoke and a pair of aligned openings which receive a trailer tongue coupler, a lower end of said shank having threads which receive a locknut to secure the dolly tongue stabilizer pin within the dolly tongue stabilizer pin opening;
  a piston that comprises a piston rod end that extends into said flared cavity when the device is activated and retracted when the device is inactive;
  a source of pressurized air which provides air into piston when fishtailing occurs between the dolly and trailer frame;
  a pneumatic control box that comprises an air inlet receiving pressurized air from the source of pressurized air, an air outlet that directs pressurized air to the piston, pins which accept voltage for operating the pneumatic control box, and a conductor extending to a speed sensor which detects speed of dolly wheels; and,
a dolly tongue coupler arranged between the yoke of the dolly tongue stabilizer pin and a dolly tongue.

* * * * *